United States Patent [19]

Petersen et al.

[11] Patent Number: 5,022,026
[45] Date of Patent: Jun. 4, 1991

[54] METHOD OF THROUGHCONNECTING WIDEBAND CONNECTIONS IN A DIGITAL TIME SWITCH MODULE BETWEEN SUBSCRIBERS, AND A DEVICE FOR CARRYING OUT THE METHOD

[75] Inventors: Lars-Göran Petersen, Tumba; Ulf M. Adamsson, Stockholm, both of Sweden

[73] Assignee: Telefonaktiebolaget L M Ericsson, Stockholm, Sweden

[21] Appl. No.: 537,707

[22] Filed: Jun. 14, 1990

[30] Foreign Application Priority Data

Jun. 26, 1989 [SE] Sweden .................................. 8902309

[51] Int. Cl.$^5$ .................................................. H04R 11/04
[52] U.S. Cl. ........................................ 370/66; 370/68; 370/58.1
[58] Field of Search ..................... 370/66, 68, 58.1, 29

[56] References Cited

U.S. PATENT DOCUMENTS

| | | | |
|---|---|---|---|
| 3,236,951 | 2/1966 | Yamamoto et al. | 370/68 |
| 4,068,098 | 1/1978 | Thyselius | 370/66 |
| 4,467,471 | 8/1984 | Troost | 370/68 |
| 4,759,012 | 7/1988 | Suzuki | 370/66 |
| 4,771,420 | 9/1988 | Deschaine et al. | 370/68 |
| 4,941,141 | 7/1990 | Hayano | 370/66 |

OTHER PUBLICATIONS

"Telecommunications, Telephone Networks 2", Ericsson, Televerket and Studentlitteratur (Lund, Sweden), 1987, chapter 9, pp. 61-68: Digital switching systems (text in English).

Primary Examiner—Douglas W. Olms
Assistant Examiner—Dang Ton
Attorney, Agent, or Firm—Burns, Doane, Swecker & Mathis

[57] ABSTRACT

A wideband connection between subscribers G and B is through-connected in a digital time switch module. Information arriving from the transmitting subscriber G is stored in a speech store (SS) on store locations (SM) corresponding to the channel numbers (8, 11, 17, 31) of G. The receiving subscriber B is assigned channels (7, 15, 21, 26). The channel numbers of G are stored in store locations (MM) of a matrix store (MS), and can be read-out via horizontal (HI) and vertical (VI) inputs. A fixed address number (6) is stored in a pointer store (PS) on store location (PM) corresponding to the channel numbers of subscriber B. When establishing the wideband connection, an internal address number (M) is written into a difference store (OS) on a store location (OM) having the address of the fixed address number (6). A time slot counter (TSC) steps forward the time slots (7, 15, 21, 26) of subscriber B and addresses the pointer store (PS), wherein the address number (6) addresses the difference store (OS). On each addressing occasion, the internal address number (M) is read-out to one of the vertical inputs (VI=18) and the time slot counter (TSC) addresses the horizontal inputs (HI) at the same time. The channel numbers of subscriber G in the store locations (MM) address the speech store (SS) and the content of the store locations (SM) are read-out to the channel numbers of subscriber B. Only the internal address number (M) need to be written-in when establishing the connection.

10 Claims, 6 Drawing Sheets

METHOD OF THROUGHCONNECTING WIDEBAND CONNECTIONS IN A DIGITAL TIME SWITCH MODULE BETWEEN SUBSCRIBERS, AND A DEVICE FOR CARRYING OUT THE METHOD

TECHNICAL FIELD

The present invention relates to a method of throughconnecting wideband connections in a digital time switch module between subscribers said wideband connections each having at least two channels, and said method comprising the steps of:
  assigning to the transmitting and the receiving subscribers channel numbers for mutually corresponding pairs of incoming and outgoing channels respectively in the wideband connections;
  writing sequentially into a speech store framewise ordered time slots entering the digital time switch module and corresponding to the channel numbers of the transmitting subscriber in a connection; and
  reading from the speech store sequential framewise ordered time slots corresponding to the channel numbers of the receiving subscriber in said connection.

The invention also relates to a device for carrying out the method.

BACKGROUND ART

A digital time switch module in a time-shared telecommunication system has a speech store into which information relating to the separate channels is written sequentially into separate store locations. The speech store is read out with the aid of a control store, so that a calling subscriber, to whom a given channel has been assigned, is connected to a called subscriber, to whom another channel has been assigned. When establishing the connection, the address of the location of the caller in the speech store is written onto the location of the called subscriber in the control store. This known method of establishing a throughconnecting is utilized in public telephone networks where each connection solely takes up one channel. In certain cases, however, the telephone network can be used to transfer information rapidly via a wideband connection which includes several of the network channels. When setting-up this wideband connection, a number of addresses of the calling subscriber are written into the control store on the locations of the called subscriber.

When connecting a normal telephone call, the time taken to write-in addresses is negligible, since only one channel is used and the call continues for a relatively long period of time. In the case of wideband connections, on the other hand, many addresses are written-in for each connection, as before mentioned. For instance, a wideband connection can include as many as 100 channels. The wideband connection can be used to transfer information to a computer or processor, wherein small quantities of information are often transferred with each connection, so that the connection is of short duration. In many instances, the information transferred comprises solely an identification code and simple digital information. Both the large number of addresses and the short duration of the connections means that the time taken to establish and to release connections constitutes a noticable part of the total connection time, which is a disadvantage. The aforedescribed digital time switch module is well known to the person skilled in this art and is found described, for instance, in "Telekommunications, Telephone Networks 2", Ericsson, Televerket and Studentlitteratur 1987, Chapter 9: "Digital Switching Systems".

DISCLOSURE OF THE INVENTION

The aforesaid problem is solved in accordance with the present invention in that channels for the wideband connection are either stored in a store or selected in accordance with a rule common to the subscribers, and in that only one number is written into a store each time a wideband connection is established.

The invention is characterized by the characterizing features set forth in the appended claims.

BRIEF DESCRIPTION OF THE DRAWINGS

The invention will now be described in more detail with reference to exemplifying embodiments thereof illustrated in the accompanying drawings, in which.

BEST MODES OF CARRYING OUT THE INVENTION

Figure 1:
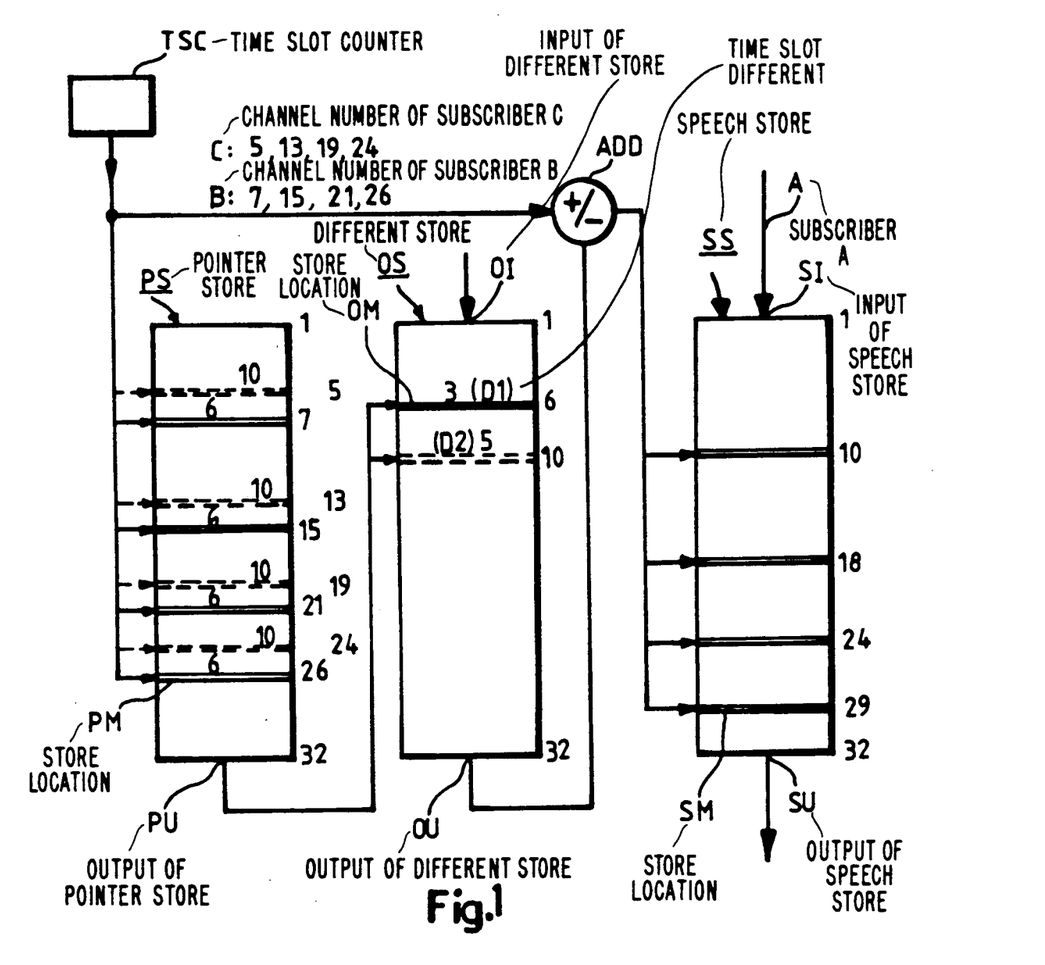
FIG. 1 is a block schematic of the digital time switch module.
Figure 2:
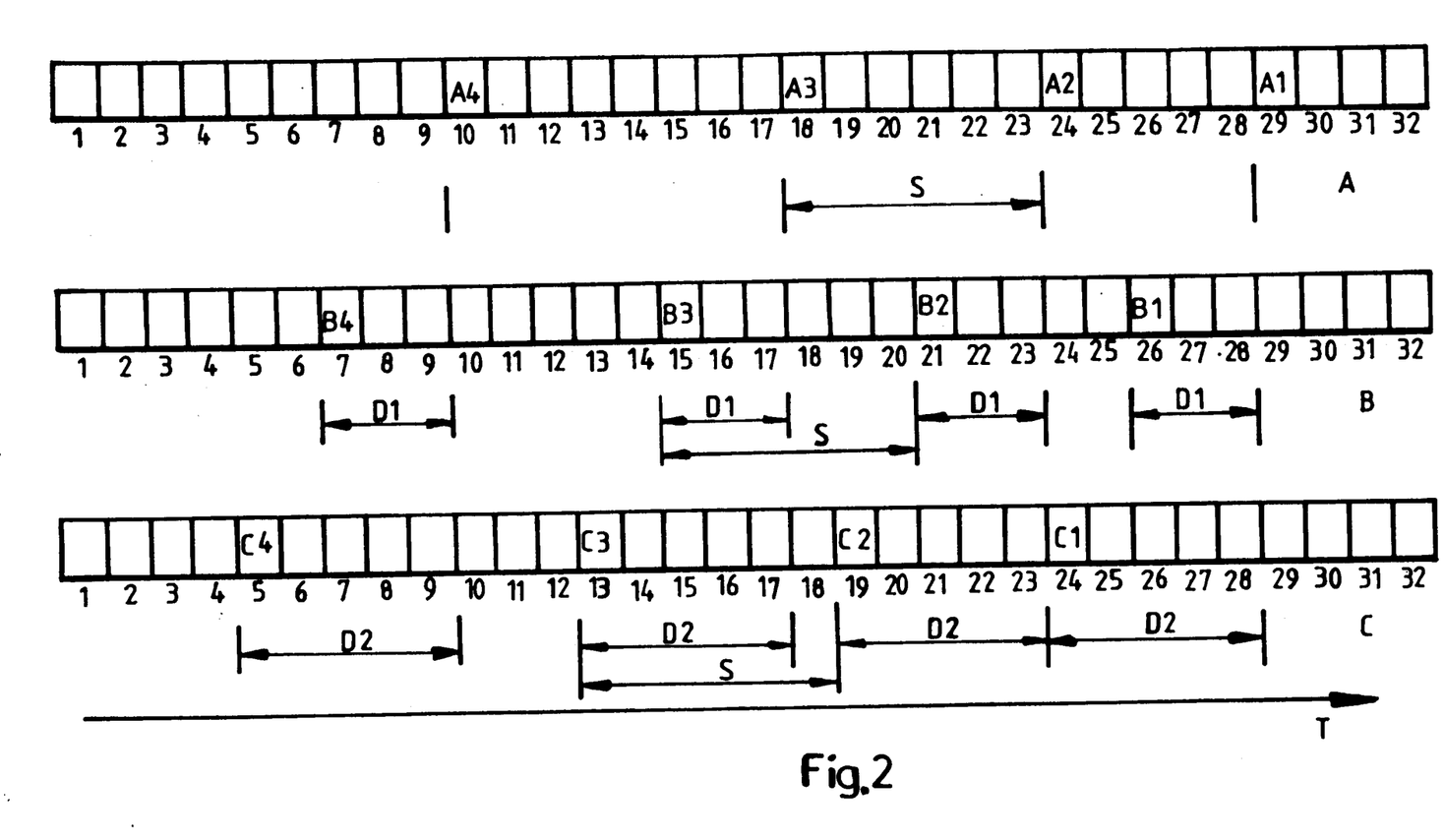
FIG. 2 is a diagram showing time slots for incoming and outgoing channels.

An embodiment of the inventive digital time switch module is illustrated in FIG. 1 and FIG. 2 illustrates the assignment of time-slots to incoming and outgoing time frames for subscribers A, B and C. The time switch module includes a pointer store PS, a difference store OS, a speech store SS and an addition circuit ADD. The pointer store PS and the addition circuit ADD are connected to a time slot counter TSC, which is a counter for the time slots that are synchronized with the telecommunication system in which the time switch module is included. The pointer store has store locations PM with addresses 1-32 which are stepped forward in keeping with the rhythm of the time slot counter TSC. The pointer store PS has an output PU which is connected to address inputs for store locations OM of the difference store OS. The difference store has an output OU which is connected to an input of the addition circuit ADD, the output of which is connected to address inputs for store locations SM of the speech store SS. The speech store has an input SI for the incoming time frames and an output SU for the outgoing time frames.

The time frames for the subscribers A, B and C are illustrated more closely in FIG. 2. The time-shared telephone system in which the time switch module in FIG. 1 is included has 32 channels and the time slots in the frames have corresponding numbers 1-32. An axis, referenced T, denotes the time. The subscriber A is assigned the channels 10, 18, 24 and 29, the time slots of which are designated A4, A3, A2 and A1 respectively. The subscriber B is assigned channels 7, 15, 21 and 26, which are correspondingly designated B4, B3, B2 and B1. The channel numbers for the subscribers A and B differ pairwise by three units corresponding to a time difference D1 of three time slots. The subscriber C is assigned the channels 5, 13, 19 and 24, which are designated C4, C3, C2 and C1 respectively. The channel numbers for the subscribers A and C differ pairwise with five units corresponding to a time difference D2 of five time slots.

The aforedescribed channel assignment or allocation is effected, for instance, when the subscribers are connected to the telecommunication system. Although the channel assignment can be changed, such changes occur relatively seldom in comparison with the frequency at which connections are established. It will be noted that in accordance with this embodiment, the subscribers have the same channels for both outgoing and incoming calls.

The pointer store PS in the inventive digital time switch module of the FIG. 1 embodiment has a store location PM for each channel and when connected to the telephone network, each subscriber is assigned at least one store location PM corresponding to the channel numbers of the subscriber. In this respect, a first number constituting one and the same fixed address number to the difference store OS is written on all store locations PM of the subscriber. Thus, the subscriber B is assigned or allotted the locations 7, 15, 21 and 26 in the pointer store and, in the case of this embodiment, obtains the address 6 to the difference store OS.

The inventive digital time switch module functions in the following manner: When subscriber A wishes to transfer information to subscriber B and a connection is established therebetween, a second number is written into the difference store OS on the store location OM with the address number 6, which is assigned to subscriber B. This second number is the relevant time slot difference D1 between the subscribers and in the case of the FIG. 2 embodiment said second number is +3 for subscribers A and B. The second number is written into the difference store OS by a control processor or computer (not shown in the Figure) connected to an input OI of the difference store OS. The control processor is operative to compare the channel numbers for the two subscribers when the connection is established, to count the second number +3 and to write this number into the location 6 allocated to the subscriber B. The information from the subscriber A is written into the speech store SS on locations which correspond to the channel numbers of the subscriber A, these numbers being 10, 18, 24 and 29 in accordance with the aforesaid. The time slot counter TSC counts the time slots numbers 1–32 to the addition circuit ADD and addresses the pointer store PS with these numbers. When the addresses 7, 15, 21 and 26 of subscriber B are stored in the pointer store, the address 6 is read into the difference store OS. The time slot difference D1, the number +3, is read into the addition circuit ADD from the store locations having the address 6 in the difference store OS. In this case, the number +3 is added to the time slot number arriving simultaneously from the time slot counter TSC and coinciding with the channel numbers 7, 15, 21 and 26 of subscriber B. The speech store is addressed from the addition circuit ADD with the calculated summation numbers 10, 18, 24 and 29, which are the channel numbers of subscriber A. These channel numbers are thus read via the output SU to time slots having the channel numbers of subscriber B.

The subscriber C has been assigned a store location OM with the address 10 in the difference store OS, which is read into the pointer store PS on the channel numbers 5, 13, 19 and 24 of subscriber C, in a similar manner as that for subscriber B. When subscriber A wishes to transfer information to subscriber C and the wideband connection is established, the time slot difference D2, the number +5, is read into the store location OM number 10. The number 5 is added to the time slot numbers 5, 10, 19 and 24 of subscriber C, as described above with respect to subscriber B, and subscriber A information stored in the speech store SS on store locations 10, 18, 24 and 29 is read-out on the time slots of the subscriber C.

The telecommunication system of the described embodiment has only 32 channels, although an actual telecommunication system may have as many as 2,000 channels, for instance. The small number of channels has been chosen solely for the purpose of enabling the invention to be shown clearly in the accompanying drawings. As before mentioned, the number of channels in a wideband connection may be in the order of 100 and will greatly exceed the four channels of the exemplifying embodiment. In the case of this embodiment, the number read into the difference store is positive, although it may equally as well be negative. For the sake of clarity, the store locations of the subscriber C have been drawn in broken lines in FIG. 1.

When writing a wideband into and reading out of the speech store SS, the time slots in the band read from said store may lie before the time slots in the band read into said store. In this case, it may be necessary to delay the read-out by a time interval, so that the time slots sequence will be the same for both the band read into the store and the band read out therefrom. This problem is well known and is solved with known techniques, and forms no part of the present invention.

In the case of the exemplifying embodiment illustrated in FIGS. 1 and 2, each of the subscribers A, B, C have the same channel numbers for their respective incoming and outgoing channels. Channel numbers and corresponding time slot number for each pair of sequential, corresponding time slots, e.g. A2 and B2, differ by a given difference D1 for subscribers A and B. Expressed in another way, two mutually sequential time slots in the wideband, for instance A2, A3 and B2, B3, are spaced apart by the same distance S for all subscribers. For reasons of capacity between the channels, it may be difficult to assign the time slots in this simple fashion, and in an alternative embodiment of the invention each subscriber has a time-slot set-up for his wideband connection and a further time-slot set-up for his incoming wideband connection. This embodiment will be described below in more detail with reference to FIG. 3 and FIG. 4.

Figure 3:
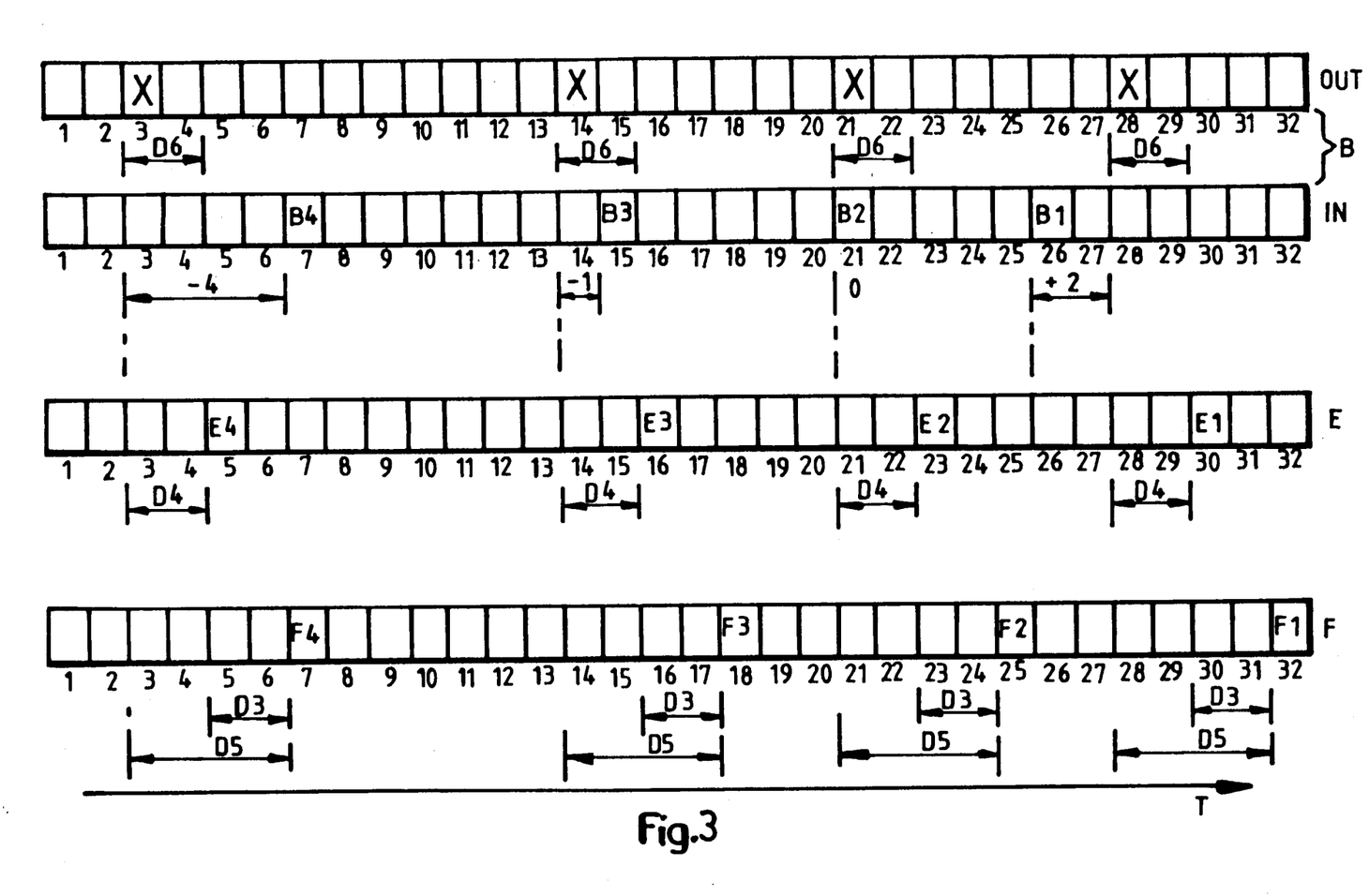
FIG. 3 is a further diagram showing time slots for incoming and outgoing channels.

FIG. 3 illustrates the assignment of the time slots to the subscriber B, who is the receiving subscriber, and for subscribers E and F, who in the present embodiment are both transmitting or calling subscribers. The subscriber B has on his incoming wideband IN the same time slots as in the preceding embodiment, namely 7, 15, 21 and 26. Of the transmitting subscribers, subscriber E has outgoing time slots 5, 16, 23 and 30, which are designated E4, E3, E2 and E1 respectively. Subscriber F has the time slots 7, 18, 25 and 32, which are designated F4, F3, F2 and F1 respectively. Two mutually corresponding time slots in the time-slot sequence of the transmitting subscribers E and F are mutually displaced by two time slots, which has been designated with a difference D3 in FIG. 3. The spacings between the time slots of the receiving subscriber B and the transmitting subscriber E consists of two parts. The one part is a difference D4 which comprises two time slots and which is common to all time slots of the transmitting subscriber in the wideband E1-E4. The other of said parts consists of a numerical sequence N of difference numbers with separate difference numbers for each of the time slots of the receiving subscriber B. This numerical sequence of difference numbers is drawn in FIG. 3 beneath the time slots of subscriber B and includes the numbers +2, 0, −1, −4 for the respective time slots B1, B2, B3 and B4 of subscriber B. In a corresponding manner, the time slot spacings between the receiving subscriber B and the transmitting subscriber F also consists of two parts. The one part is a difference D5, comprising four time slots, and the other is said numerical sequence N of difference numbers −4, −1, 0, +2.

As mentioned in the aforegoing, in the latter embodiment all of the subscribers have one time-slot set-up for their outgoing wideband and another time-slot set-up for their incoming wideband. It will be noted that, in accordance with the invention, these time slots are selected commonly for all outgoing widebands, so that mutually corresponding time slots in the time-slot sequence will be displaced relative to one another by a given channel difference. In this respect, the subscribers E and F have the said channel difference D3 and subscriber B has in respect of his outgoing wideband OUT a corresponding channel difference D6 in relation to the subscriber E. The outgoing time slots of subscriber B are 3, 14, 21 and 26, all of which are designated X and the difference D6 is −2. The ingoing widebands are selected commonly for all subscribers, in a corresponding manner. The time slots for the ingoing widebands of the subscribers E and F are displaced by a given channel difference in relation to the ingoing time slots IN of subscriber B. The ingoing widebands for subscribers E and F have not been shown in FIG. 3. The aforesaid numerical sequence N of difference numbers −4, −1, 0, 2 is common to all subscribers when connecting an outgoing wideband to an incoming wideband. Each of the difference numbers represents the difference between the channel numbers for two mutually corresponding pairs of outgoing and ingoing channels of, for instance, the subscriber B, thus 28−26=+2, 21−21=0, 14−15=−1 and 3−7=−4. The numerical sequence of difference numbers can deviate from the illustrated numerical sequence by one interger, which is added to each of the difference numbers in the illustrated numerical sequence. In this case, the same integer is subtracted from the channel differences D4 and D5.

Figure 4:
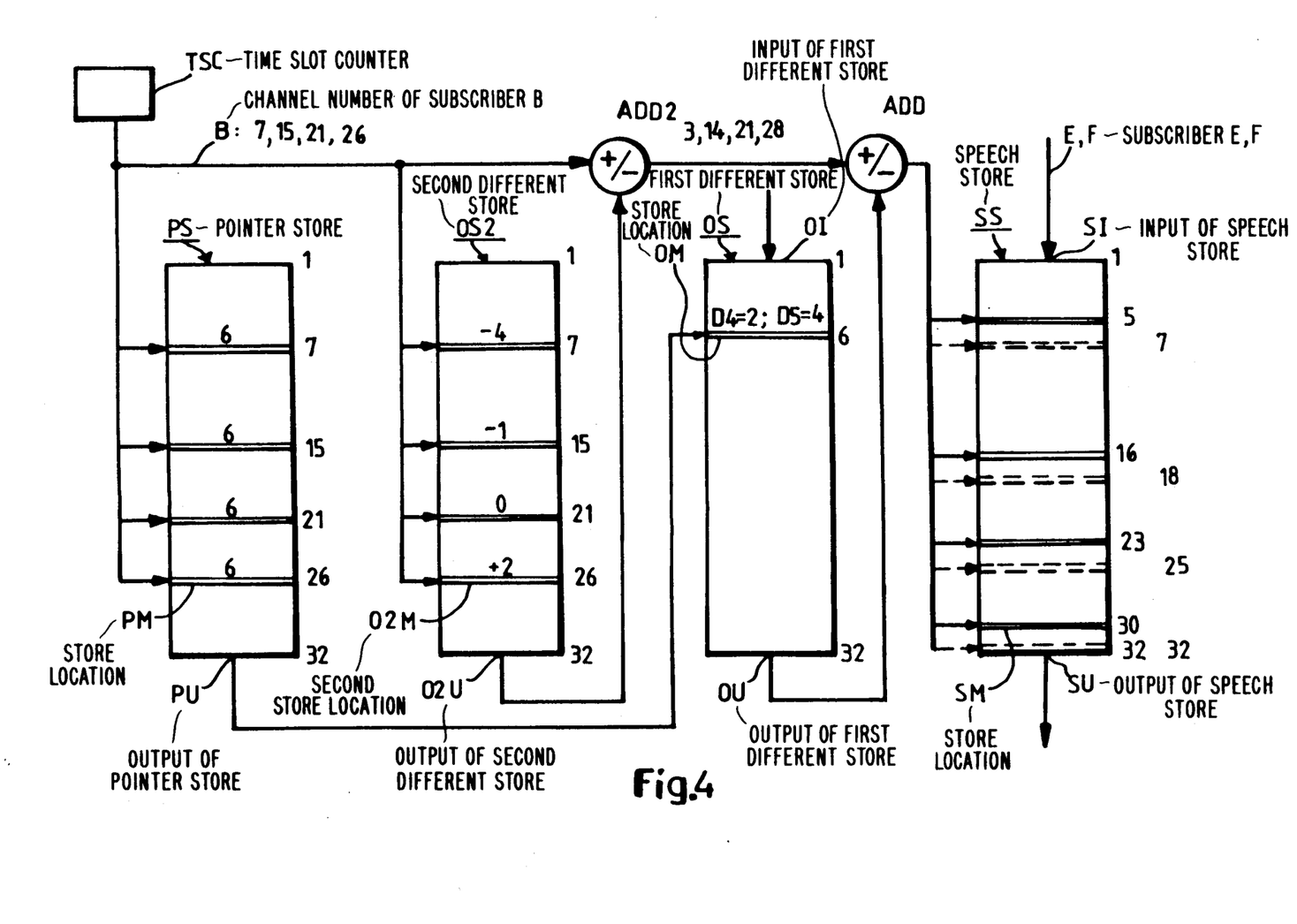
FIG. 4 is a block schematic of an alternative embodiment of the digital time switch module.

FIG. 4 illustrates an inventive device for throughconnecting a wideband connection from either the subscriber E or the subscriber F to the subscriber B. The device illustrated in FIG. 4 differs from the device illustrated in FIG. 1, in that the FIG. 4 embodiment includes a second difference store OS2 and an addition circuit ADD2, but in other respects is the same as the FIG. 1 embodiment and corresponding components are identified by the same reference signs. The address inputs to the store cells O2M of the second difference store OS2 are connected to the time slot counter TSC and the output O2U of said store is connected to an input of the second addition circuit ADD2, which has an input connected to the time slot counter TSC and the output of which is connected to the input of the first addition circuit ADD.

Throughconnection of a wideband connection between the subscriber B and the subscriber E is established in the following manner. The information to be transferred from E is stored in the speech store SS in the store cells SM corresponding to the output time slots 5, 16, 23 and 30 of subscriber E. As with the preceding embodiment, the pointer store PS contains the fixed address number 6 in the store cells PM, corresponding to the incoming time slots 7, 15, 21 and 26 of the subscriber B. The second difference store OS2 contains the difference numbers −4, 1, 0, +2 of the numerical sequence in store cells corresponding to the incoming time slots 7, 15, 21 and 26 of the subscriber B. When establishing the wideband connection, the control processor, not shown in FIG. 4, calculates the difference D4=2 and writes the number 2 into the store cell OM with the address 6 in the difference store OS. When the time slot counter TSC reaches one of the time slots of subscriber B, for instance slot 7, the address 6 is read from the pointer store PS and the number −4 is read from the second difference store OS2. This difference number in the numerical sequence is delivered to the second addition circuit ADD2 and is added to the time slot number 7. The addition circuit ADD2 sends a number 7+(−4)=3 to the addition circuit ADD. This circuit receives the number +2, the channel difference D4, from the store cell number 6 in the difference store OS, which has been addressed from the pointer store PS. The addition circuit ADD sends the address number 3+2=5 to the speech store SS. Thus, the content of the store cell SM having number 5 is read from the speech store SS at the time slot 7 for the receiving subscriber B.

When establishing the wideband connection from subscriber F to subscriber B, the information from the subscriber F is read into the speech store SS on the addresses 7, 18, 25 and 32, in a corresponding manner. The control processor calculates the channel difference D5=4 and writes this number on the address 6 in the difference store OS. The time slot counter TSC steps forward the time slots 7, 15, 21 and 26 of the subscriber B, the pointer store PS and the second difference store OS2 are addressed, and the addition circuit ADD2 subsequently adds the difference numbers in the numerical sequence −4, −1, 0, +2 to said time slot numbers. The address number 6 of the first difference store OS is read from the pointer store PS, and the channel difference D5=4 is read from the first difference store OS to the addition circuit ADD. This addition circuit addresses the speech store SS with the added address 7, 18, 25 and 32 and information from subscriber F is read from the incoming time slots of the subscriber B.

Figure 5:
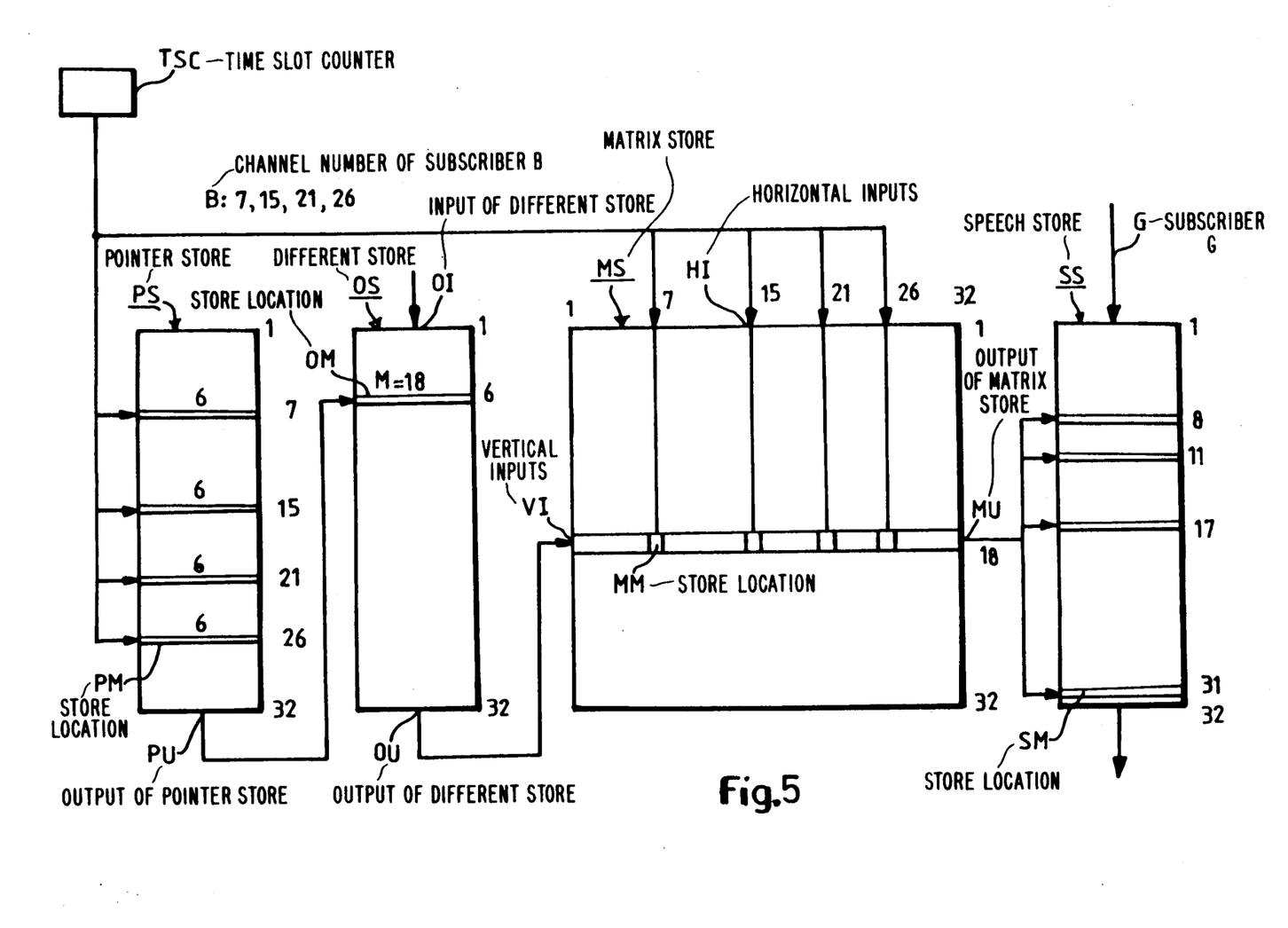
FIG. 5 is a block schematic of still a further alternative embodiment of the digital time switch module.

A further alternative embodiment of the invention will now be described with reference to FIG. 5 and FIG. 6. This embodiment is used when there is found no common, simple rule by which the incoming and outgoing channel numbers of the individual subscribers can be selected. Such a situation can arise, for instance, when communication is established between two separate telephone networks in which the subscribers have already been assigned wideband channels in accordance with two separate rules which cannot be made compatible in a simple manner.

Similar to the digital time switch modules described above, the digital time switch module of the FIG. 5 embodiment includes the speech store SS, the pointer store PS and the difference store OS. This time switch module does not include the adder ADD but has a 32×32 matrix store MS having vertical inputs VI which are connected to the output OU of the difference store OS. The matrix store also has horizontal inputs HI, which are connected to the time slot counter TSC, and outputs MU, which are connected to the address inputs of the speech store SS. The matrix store MS has store locations MM, which are 32×32 in number and which are addressed via the inputs VI and HI. The numerical values defining wideband connections between transmitting and receiving subscribers are stored in the store locations MM, as described in more detail here below with reference to an example.

Figure 6:
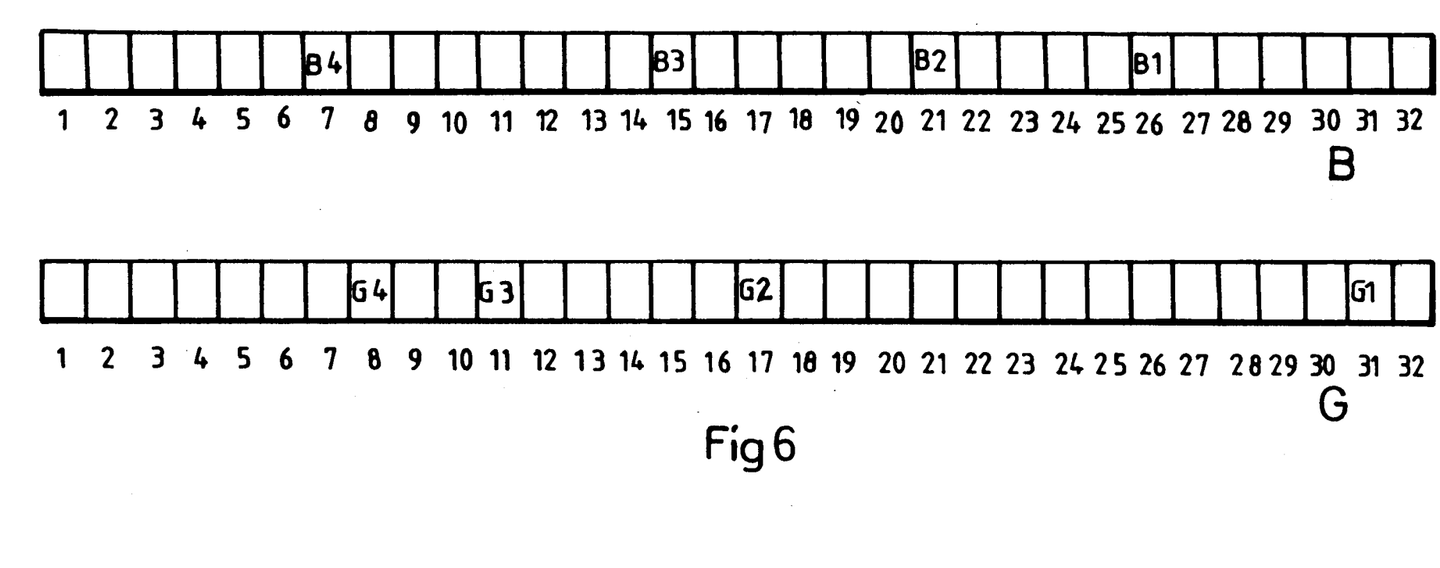
FIG. 6 is a diagram showing time slots for the time switch module of FIG. 5.

The subscriber B, who is the receiving subscriber, has the same incoming channel numbers as in the preceding embodiments, namely 7, 15, 21 and 26 as shown in FIG. 6. A transmitting subscriber G, who wishes to transfer information to subscriber B, has outgoing channel numbers 8, 11, 17 and 31, designated G4, G3, G2 and G1 respectively. As with the preceding embodiments, the first number 6 has been read into the pointer store PS on the store locations 7, 15, 21 and 26, which correspond to the channel numbers of subscriber B. The first number 6 is the fixed address number of the store location 6 in the difference store OS. When G is connected to the telephone network as a subscriber, this subscriber is assigned one of the inputs VI of the matrix store MS, in the case of the present embodiment the input having an internal address number M=18. Upon establishing the connection of subscriber G with the telephone network, the address number of the speech store SS is written into the store locations MM, which can be reached via the vertical input 18 and via the horizontal input 7, 15, 21 and 26. The address numbers of the speech store SS correspond to the channel numbers of the subscriber G. Thus, the number 8 is written into store locations having the addresses VI =18 and HI=17, the number 11 is written into the addresses VI=18 and HI=15, and so on for all channels. In this way, there is defined with the aid of the matrix store MS a correspondence between the channel numbers of the transmitting subscriber and the receiving subscriber B.

The time switch module operates in the following manner. When establishing the wideband connection between the subscribers B and G, the number 18 is written into the difference store OS on the store location OM having address number 6. This writing-in function is effected by the aforesaid control processor (no shown) in which information is stored in a register to the effect that the receiving subscriber B has the first number 6 in the pointer store PS and that the transmitting subscriber G has the vertical input VI=18 in the matrix store MS. The information from subscriber G is written framewise into the speech store SS on the locations 8, 11, 17 and 31 corresponding to the channel numbers of subscriber G. When reading information from the speech store to the subscriber B, the time slot counter TSC steps forward to time slot 7 and addresses the pointer store PS, from which the first number 6 is read out and addresses the difference store OS. The number 18 is read-out from the store location OM=6 and addresses the vertical input VI=18 in the matrix store MS. At the same time, the time slot counter TSC addresses the horizontal input HI=7 and the content of the store location VI=18 and HI=7 is read out. In accordance with the aforegoing, the number 8 which addresses SS is found on this store location. The content of the store location SM=8 is read-out to channel numbers 7 of subscriber B. The time slot counters continue to step forward the time slots 15, 21 and 26 and the respective store locations 11, 17 and 31 are read from the speech store SS in a corresponding manner.

The embodiment last described merely constitutes an example and various modifications can be made. For instance, the content of the store location MM may comprise difference numbers which are added to the channel numbers of the receiving subscriber, so as to form addresses to the speech store SS. The essence of the invention is that when establishing a wideband connection, solely one numerical value is written into a store and that correspondence between incoming and outgoing channel numbers in other respects are predefined in the stores of the digital time switch module.

We claim:

1. A method of throughconnecting wideband connections in a digital time switch module between subscribers, said wideband connections each having at least two channels, and said method comprising the steps of:
   assigning to the transmitting and the receiving subscribers channel numbers for mutually corresponding pairs of incoming and outgoing channels respectively in the wideband connections;
   writing sequentially into a speech store framewise ordered time slots entering the digital time switch module and corresponding to the channel numbers of the transmitting subscriber in a connection;
   reading from the speech store sequential framewise ordered time slots corresponding to the channel numbers of the receiving subscriber in said connection;
   assigning numerical values to the mutually corresponding pairs of channels in the wideband connection and storing said numerical values in a matrix store;
   assigning to the wideband connection between the transmitting and the receiving subscriber an internal address number in the time switch module;
   writing the internal address number into a difference store when establishing said wideband connection;
   reading out the internal address number from the difference store in accordance with the time slot number of the receiving subscriber when establishing said throughconnection; and
   addressing the speech store through the numerical values in the matrix store in accordance with the time slot numbers of the receiving subscriber and the internal address number.

2. A method of throughconnecting wideband connections in a digital time switch module between subscribers, said wideband connections each having at least two channels and said method comprising the steps of:
   assigning to the transmitting and the receiving subscribers channel numbers for mutually corresponding pairs of incoming and outgoing channels respectively in the wideband connections;
   writing sequentially into a speech store the framewise ordered time slots entering the digital time switch module and corresponding to the channel numbers of the transmitting subscriber in a connection;
   reading out the speech store sequentially in framewise ordered time slots corresponding to the channel numbers of the receiving subscriber in said connection;
   assigning to the mutually corresponding pairs of channels in said wideband connection numbers which deviate from each other by at least one channel difference which is common to all of the channels in said wideband connection;

reading the channel difference into a first difference store when establishing the wideband connection;

writing the channel difference from the first difference store in accordance with the channel numbers of the receiving subscriber and adding said channel difference to said channel numbers to form an added address; and addressing the speech store in accordance with the added address.

3. A method of throughconnecting wideband connections in a digital time switch module in accordance with claim 2, further comprising the steps of:

assigning to the mutually corresponding pairs of channels numbers which further deviate from one another by a numerical sequence of difference numbers common to all of the subscribers and in which the individual difference numbers each correspond to the difference between the channel numbers for two mutually corresponding pairs of outgoing and incoming channels of one and the same subscriber;

storing the difference numbers in the numerical sequence in a second difference store; and reading-out the difference numbers in the numerical sequence in accordance with the channel numbers of the receiving subscriber and adding said difference numbers together with said channel difference to said channel numbers so as to form the added address.

4. A method of throughconnecting a wideband connection in a digital time switch module between subscribers in accordance with claim 2, further comprising the steps of:

reading a fixed address number belonging to the receiving subscriber into a pointer store on addresses which correspond to the channel numbers of the receiving subscriber;

writing the channel difference into the first difference store on an address corresponding to said fixed address number in the pointer store; and addressing the pointer store with the aid of channel numbers of the receiving subscriber, said fixed address number being read-out and the first difference store being addressed in accordance with said fixed address number.

5. A digital time switch module for carrying out the method according to claim 1 for throughconnecting wideband connections each having at least two channels between subscribers, of which the transmitting and the receiving subscribers are assigned channel numbers for mutually corresponding pairs of incoming and outgoing channels respectively in the wideband connections and said digital time switch module has a speech store into which framewise ordered time slots corresponding to the channel numbers of the transmitting subscriber in a connection entering the time switch module are written in sequentially, and from which speech store framewise ordered time slots corresponding to the channel numbers of the receiving subscriber in said connection are read-out sequentially wherein;

the digital time switch module includes a matrix store in which numerical values assigned to the mutually corresponding pairs of channels in the wideband connection are stored;

the digital time switch module includes a difference store into which an internal address number is written when establishing the wideband connection, said address number being assigned to the wideband connection between the transmitting and the receiving subscriber;

a time slot counter is connected to the difference store and to the matrix store;

the matrix store is connected to address inputs of the speech store; and the difference store and the matrix store are read-out during the throughconnecting period of the connection in accordance with the time slot counter at the time slots of the receiving subscriber.

6. A digital time switch module for carrying out the method according to claim 2 of throughconnecting wideband connections each having at least two channels between subscribers, of which the transmitting and the receiving subscribers are assigned channel numbers for mutually corresponding pairs of incoming and outgoing channels respectively in the wideband connections, said digital time switch module having a speech store in which framewise ordered time slots entering the module and corresponding to the channel numbers of the transmitting subscriber in a connection are written sequentially and from which speech store framewise ordered time slots corresponding to the channel numbers of the receiving subscriber in said connection are read-out sequentially wherein;

the digital time switch module includes at least one first difference store into which there is written, when establishing the wideband connection, a channel difference which includes a deviation between the channel numbers of the mutually corresponding pairs of channels and which is common to all of the channels in said wideband connection;

the digital time switch module has an addition circuit which is connection to the first difference store and to a time slot counter and which functions to add the time slot number of the receiving subscriber with said channel difference to form an added address, wherein the channel difference is read out from the difference store at the time slot number of the receiving subscriber with the aid of the time slot counter; and the addition circuit is connected to the speech store and reads-out the speech store to the time slots of the receiving subscriber.

7. A digital time switch module according to claim 6, wherein the time switch module includes a further difference store in which there is stored a numerical sequence of difference numbers on store locations corresponding to the channel numbers of the receiving subscriber, wherein the mutually corresponding pairs of channels have numbers which further deviate from one another by the difference numbers in the numerical sequence which is common to all subscribers and in which each of the separate difference numbers corresponds to the difference between the channel numbers for two mutually corresponding pairs of outgoing and incoming channels of one and the same subscriber; and the further difference store is connected to the time slot counter and to the addition circuit, which functions to add the difference numbers with their respective channel numbers for the receiving subscriber.

8. A digital time switch module according to claim 6, wherein the time switch module includes a pointer store in which a fixed address number belonging to the receiving subscriber is stored on addresses corresponding to the channel numbers of the receiving subscriber;

the output of the pointer store is connected to an input of an address of the first difference store, said address corresponding to the fixed address number in the pointer store and on which address the channel difference is written; and the address inputs of the pointer store are connected to the time slot counter and are addressed in accordance with the channel numbers of the receiving subscriber.

9. A method of throughconnecting a wideband connection in a digital time switch module between subscribers in accordance with claim 3, further comprising the steps of:

reading a fixed address number belonging to the receiving subscriber into a pointer store on addresses which correspond to the channel numbers of the receiving subscriber;

writing the channel difference into the first difference store on an address corresponding to said fixed address number in the pointer store; and addressing the pointer store with the aid of channel numbers of the receiving subscriber, said fixed address number being read-out and the first difference store being addressed in accordance with said fixed address number.

10. A digital time switch module according to claim 7, wherein the time switch module has a pointer store in which a fixed address number belonging to the receiving subscriber is stored on addresses corresponding to the channel numbers of the receiving subscriber;

the output of the pointer store is connected to an input of an address of the first difference store, said address corresponding to the fixed address number in the pointer store and on which address the channel difference is written; and the address inputs of the pointer store are connected to the time slot counter and are addressed in accordance with the channel numbers of the receiving subscriber.

* * * * *